United States Patent [19]
Bush et al.

[11] Patent Number: 5,150,465
[45] Date of Patent: Sep. 22, 1992

[54] MODE-SELECTABLE INTEGRATED DISK DRIVE FOR COMPUTER

[75] Inventors: Kenneth L. Bush, Cypress; Ralph S. Perry, Houston; Thomas W. Grieff, Houston; George J. Scholhamer, Houston, all of Tex.

[73] Assignee: Compaq Computer Corporation, Houston, Tex.

[21] Appl. No.: 815,900

[22] Filed: Dec. 31, 1991

Related U.S. Application Data

[63] Continuation of Ser. No. 277,760, Nov. 30, 1988.

[51] Int. Cl.⁵ .............................................. G06F 13/00
[52] U.S. Cl. .................................... 395/275; 395/250; 364/DIG. 1; 364/239; 364/239.1; 364/239.5; 364/245; 364/245.1; 364/245.6; 364/247; 364/247.4; 364/247.6; 364/252.6; 364/254.3; 364/254.8; 364/254.9; 364/260; 364/284.1; 364/248.1
[58] Field of Search ......... 364/DIG. 1, 900, DIG. 2; 395/275, 250, 725, 200; 382/470; 358/432, 444

[56] References Cited

U.S. PATENT DOCUMENTS

| | | | |
|---|---|---|---|
| 4,246,637 | 1/1981 | Brown et al. | 364/200 |
| 4,451,884 | 5/1984 | Heath et al. | 364/200 |
| 4,459,677 | 7/1984 | Porter et al. | 364/900 |
| 4,475,155 | 10/1984 | Oishi et al. | 364/200 |
| 4,490,782 | 12/1984 | Dixon et al. | 364/200 |
| 4,493,028 | 1/1985 | Heath | 364/200 |
| 4,505,113 | 4/1985 | Heath | 364/200 |
| 4,534,011 | 8/1985 | Andrews et al. | 364/900 |
| 4,571,671 | 2/1986 | Burns et al. | 364/200 |
| 4,607,348 | 8/1986 | Sheth | 364/900 |
| 4,644,463 | 2/1987 | Hotchkin et al. | 364/200 |
| 4,716,523 | 12/1987 | Burrns, Jr. et al. | 364/200 |
| 4,783,730 | 11/1988 | Fischer | 364/200 |
| 4,852,127 | 7/1989 | Fraser et al. | 375/94 |
| 4,899,275 | 2/1990 | Sachs et al. | 395/425 |
| 5,038,278 | 8/1991 | Steely, Jr. et al. | 364/200 |

OTHER PUBLICATIONS

Steve Rosenthal, "The Alphabet Soup of Disk Interfaces", *PC Week*, Aug. 22, 1988, p. 60.
Steve Rosenthal, "Disk Drives Meet More Stringent Requirements", *PC Week*, Aug. 22, 1988, pp. 59, 64.

*Primary Examiner*—Michael R. Fleming
*Assistant Examiner*—Ayaz R. Sheikh
*Attorney, Agent, or Firm*—Konneker & Bush

[57] ABSTRACT

An interface between a CPU bus and peripheral device such as a standard embedded controller disk drive uses either a dedicated, I/O mapped register set for control and status communication between the host CPU and the disk controller, or an alternate "flex mode" protocol which allows the drive to be used with great versatility in a wide variety of systems. This alternate "flex mode" protocol does not require changes to the hardware definition of the drive interface, but instead uses the data port to transfer information blocks to set up a subsequent data transfer through this port.

14 Claims, 4 Drawing Sheets

| BIT 7 | | | | | | | BIT 0 |
|---|---|---|---|---|---|---|---|
| TIP | NOT USED | NOT USED | DRQ | DTH | BSY | INT | XIP |

| BIT 7 | | | | | | | BIT 0 |
|---|---|---|---|---|---|---|---|
| ERR | INV | REJ | 0 | 0 | DRV | RTU | CER |

| BIT 7 | | | | | | | BIT 0 |
|---|---|---|---|---|---|---|---|
| CMB | PMB | STB | LDR | 0 | DRV | 0 | ABT |

| BIT 7 | | | | | | | BIT 0 |
|---|---|---|---|---|---|---|---|
| LXC | OIP | NOT USED | NOT USED | TRANSFER COUNT MSB | | | |

| BIT 7 | | | | | | | BIT 0 |
|---|---|---|---|---|---|---|---|
| BY | NOT USED | NOT USED | NOT USED | DQ | DH | NOT USED | ER |

| 15 | | | 8 | 7 | | | | 0 | |
|---|---|---|---|---|---|---|---|---|---|
| DEVICE TYPE | | 0 | 0 | XFER RATE | CEN | 0 | 0 | 0 | RETRY COUNT | —72 |
| FORMAT GAP 2 LENGTH | | | | FORMAT GAP 1 LENGTH | | | | | —74 |
| FORMAT SYNC LENGTH | | | | FORMAT GAP 3 LENGTH | | | | | —76 |
| RESERVED | | | | SEEK STEP RATE | | | | | —78 |
| WRITE PRECOMP. CYLINDER LOW | | | | WRITE PRECOMP. CYLINDER HIGH | | | | | —80 |
| CYLINDERS PER DRIVE LOW | | | | CYLINDERS PER DRIVE HIGH | | | | | —82 |
| HEADS PER CYLINDER | | | | SECTORS PER TRACK | | | | | —84 |

MODE-SELECTABLE INTEGRATED DISK DRIVE FOR COMPUTER

This is a continuation of application Ser. No. 07/277,760, filed Nov. 30, 1988.

BACKGROUND OF THE INVENTION

The present invention relates to digital computer systems, and more particularly to a communication protocol used between a central processing unit of a computer and a peripheral device.

A digital computer system consists of a set of functional components of at least three basic types: memory units, input/output (I/O) devices, and central processing units (CPUs). Memory units provide storage for binary data, typically organized as N words each having M bits. Each word in a memory unit is assigned a unique numerical address (O,1, ..., N-1). The set of all addresses assigned to the memory units in a computer system defines that system's memory address space. The maximum size of a system's memory address space is limited by the number of bits in the addresses identifying unique memory locations. For example, if each address in a computer system consists of ten bits, $2^{10}$ unique locations can be specified. Memory words can be written or read by other components in the computer system.

I/O modules are functionally similar to memory modules, in that they can support both read and write operations. An I/O module usually consists of an I/O device and a device controller. Floppy and hard disk drives, tape drives, printers, display screens, CD ROMs, and modems are all examples of I/O devices. A device controller functions to receive commands and data from other system components, and causes the I/O device to operate in accordance with those commands. Unique addresses can be assigned to each word of data stored in or provided by an I/O module. The set of addresses available for assignment to I/O modules in a system defines that system's I/O address space, the size of which is limited only by the number of bits used to specify an I/O address.

CPUs are typically the focal point of activity in a computer system. A CPU reads instructions and data from memory or from I/O devices, performs logical or arithmetic manipulations on data as directed by instructions, and writes data to memory or to I/O modules after processing.

A growing trend in computer systems design has been to utilize the techniques of virtual memory management in order to increase the effective memory address space of a computer system to be as large as the addressing capability of the CPU, even though the actual memory physically present is much less. In one typical way of using virtual memory techniques the storage facilities provided by I/O modules merged with the memory address space to form a larger "virtual memory space". In this way, using "swapping", the storage facilities of magnetic disks or the like can be used to provide a very large memory space for the processing unit at a cost that is significantly less than if the same size memory space was implemented with costly RAM devices.

The time required to access (read or write) a particular location in a peripheral storage device is typically much slower than the access time for a location in a RAM OR ROM memory unit. Thus, in order for peripheral storage devices to be useful, either in providing conventional bulk storage or in providing a larger virtual memory space for the system, these devices must be very efficient, providing the fastest possible access to the stored information.

The channel of communication of digital information between the various components which comprise a computer system is commonly provided in the form of a collection of electrically conductive lines called a bus. In many systems, a single bus connects each of the system components together, and access to the bus is shared among all components which may require it. A system bus typically includes lines which carry addresses (either I/O space addresses or memory space addresses), lines which carry data, and lines which carry control information. The format and timing of address, data and control information as it is passed along a shared bus is called the bus protocol. A number of different bus protocols have been previously used. In order for a module to communicate with other components in a system, the module should have a bus interface residing between the module and the shared system bus which enables the module to communicate vie the system bus in a manner that conforms to the specified bus protocol.

In the case of I/O modules, the system bus interface receives information from the bus in the specified bus format and passes this information to the I/O controller. The I/O controller then translates this information into a format that is appropriate for the I/O device that it controls, and causes the I/O device to perform the function specified as part of the information passed to the I/O module. Standard protocols are known for coordinating the communication between an I/O controller and an I/O device, just as there are various protocols for specifying communication between the I/O controller and other system components on the shared system bus.

One method for implementing the interface between a processor and an I/O module is to "map" the I/O module in the I/O space of the processor; that is, certain addresses in the I/O space of the processor are reserved for use by a particular I/O module. When data on the system bus is addressed to these reserved locations, the I/O module's bus interface can decode the address on the system bus and identify the corresponding data as being sent to that I/O module. The I/O controller thus intercepts the data and control information sent to it, and causes the I/O device to operate accordingly.

Various types of disk drive controllers are discussed in articles puplished in PC Week, Aug. 22, 1988, pp. 59, 60 and 64. For example, single-user DOS-based systems have predominantly used a controller card and separate drives, with an industry-standard "ST506" interface. Another alternative for disk drive interface is the "Small Computer System Interface" or "SCSI" method.

The CP-341 disk drive manufactured by Conner Peripherals, Inc., is an example of an I/O module which employs an I/O mapped register interface between the controller and the system processor. The CP-341 is an "integrated" drive, referring to the fact that the single unit incorporates both the disk drive device and the controller hardware. The embedded CP-341 controller provides a set of ten registers that are mapped into the I/O space of the host system. These registers, which comprise the software interface between the host and the controller, each have a statically defined function and are accessed through I/O read and write instructions executed by the processor. The CP-341 controller receives data and commands via these registers, and converts this information into the primitive control instructions comprehensible to the disk drive itself. The system processor, in turn, receives status information, error codes and data from the drive via the same registers. The integrated CP-341 drive facilitates processor access to the I/O mapped registers via a precisely defined set of control signal lines, which comprise the hardware interface between the processor and the controller. Together, the hardware and software interfaces implemented by the CP-341 conform to what has become a defacto industry standard protocol.

The register set software interface employed by the CP-341 and other so-called "Industry Standard Architecture" (ISA) integrated drives is limiting in the sense that disk driver software executed by the system processor must communicate with the drive using only the ten registers described above, regardless of the software's capabilities and command structures, or of the potential for enhanced functionality on the part of the drive. More comprehensive, "intelligent" disk driving software or disk drives could potentially require the communication of additional control and status information between the processor and the drive module. Such information, along with the parameter and status words already included in the definition of the CP-341's register set could easily overflow the I/O mapped register space provided under this protocol. This additional information includes: specification of specialized formatting parameters, such as variable numbers of sectors per track, variable sector size, unique ID bytes, gap lengths, or data fill patterns; specification of seek operation parameters, such as alternate disk seek optimization algorithms; specification of alternate buffering and caching algorithms; enhanced error detection and correction information, including detailed error history reports, specification of retry parameters; specification of data encryption algorithms, data compaction algorithms, or defect management algorithms; specification and reporting of diagnostic tests; or specification of additional opcodes and commands not defined in the standard protocol. Clearly, the transfer of some or all of this additional information between the host processor and the I/O module at command entry or command completion could not efficiently be accomplished using only the ten registers specified in the standard protocol.

An alternative to the conventional register set software interface is a "block-transfer" protocol, previously known, which overcomes many of the limitations of a dedicated I/O mapped register interface, allowing a computer system to exploit additional functionality on the part of either the disk drive itself, the operating system disk driving software, or both. This "block-transfer" type of interface protocol specifies that configuration, status, and parameter information, as well as data, be transferred across the host/peripheral interface in the form of multiple-word information blocks, rather than in the single-word formats of conventional I/O mapped register set interfaces. Various block-transfer interface protocols have been previously disclosed, examples being the so-called PS/2 ESDI or ST506 protocols. Typically, a block-transfer protocol specifies that registers similar to the I/O mapped registers of conventional register set interfaces be provided for coordinating the transfers of blocks of information, while the information blocks themselves are transferred using techniques of direct memory access (DMA) or other high-speed transfer methods.

Block-transfer interface protocols have an advantage over register set protocols in that each of the various information block formats can be defined to hold as much information as the disk drive or disk driving software requires. Whereas in register set interfaces, for example, status information is passed from the disk drive to the host via a single word in a "status register", with a block-transfer protocol a multiple-word status "block" can be defined which holds as much status information about the disk drive as desired. Likewise, configuration information, error detection/correction information, drive parameter information or other control or diagnostic information can be transferred between host and peripheral in blocks which are as large or small as necessary to suit the disk drive and disk driving software.

It is accordingly an object of the present invention to provide a disk drive which offers the versatility of block-transfer information exchange. It is a further object of this invention to provide a disk drive which is mode-selectable such that it can also support conventional I/O mapped register set communication with a host processor. Yet another object of the present invention is to provide a disk drive which conforms to the hardware interface specified for the standard register set interface protocol, but which can be applied in systems having one of a wide range of different disk drivers or bus definitions, without requiring modifications to the drive programming or electrical interface. Using a drive which conforms to the present invention, therefore, allows disk drivers the flexibility to send and receive information in almost any format.

SUMMARY OF THE INVENTION

According to an embodiment of the present invention, a disk drive is provided which conforms to the hardware interface specified for so-called "AT bus" industry standard drives, but which is mode-selectable to operate either in the conventional register set mode (hereinafter referred to as "register mode"), or in a block-transfer mode (hereinafter referred to as "flex mode"). The definition of information block formats for block transfer mode operation is included as part of the software code stored in the ROM or RAM accessed by a microprocessor in the disk drive's controller. These information block definitions provide a firmware "adapter" which recognizes whatever protocol is used by operating system disk driving software and which can convert information sent from the disk driver into formats comprehensible to the disk drive of the present invention, the disk drive of the present invention can be used, without modification to its hardware interface or internal programming, in a wide variety of systems. A disk drive in accordance with the present invention has the information block flexibility to emulate a variety of block-transfer interface protocols, yet remains fully compatible with the ISA compatible "register mode" protocol.

BRIEF DESCRIPTION OF THE DRAWINGS

The novel features believed characteristic of the invention are set forth in the appended claims. The invention itself, however, as well as other features and advantages thereof, will be best understood by reference to the detailed description of a specific embodiment, when read in conjunction with the accompanying drawings, wherein:

DETAILED DESCRIPTION OF A SPECIFIC EMBODIMENT

Figure 1:
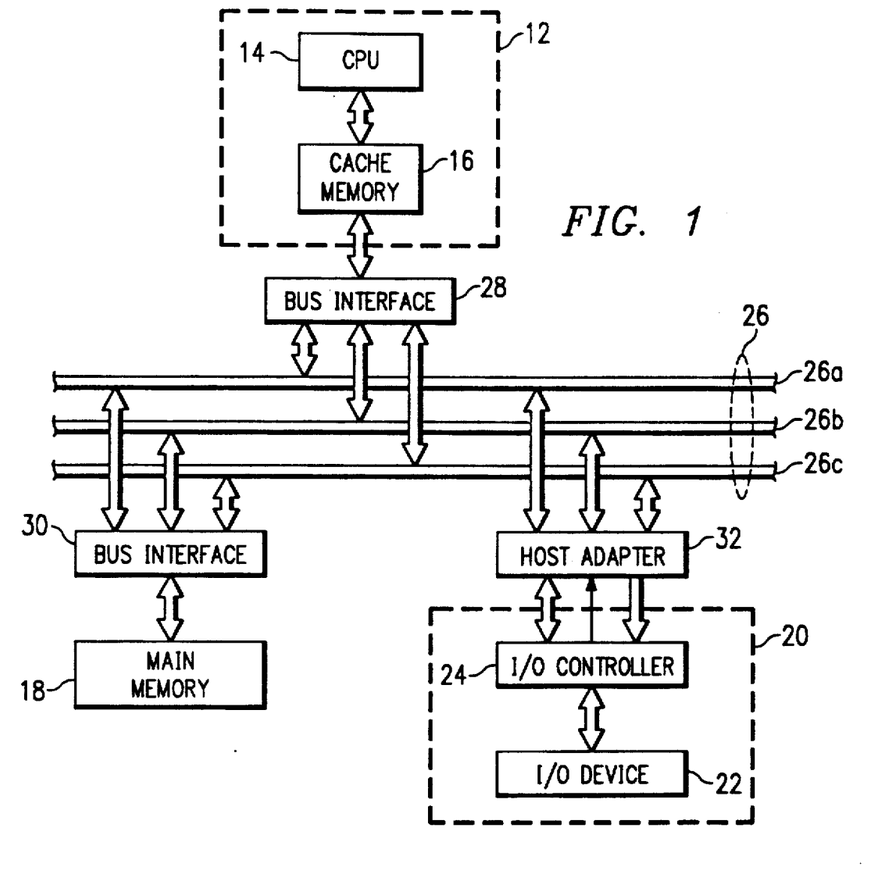
FIG. 1 is a simplified block diagram showing a digital computer system.

FIG. 1 shows a simplified block diagram of a digital computer system which can utilize the I/O interface protocol of the present invention. This system consists of the basic functional components of a computer system, including:

- a central processing unit (CPU) module 12 consisting of a digital processor 14 and a private cache memory 16 for holding copies of recently accessed main memory locations;
- a main memory module 18 providing the physical memory space which holds instructions and data for use by the CPU module 12 and other system components;
- an I/O module 20, which in one embodiment is a hard disk drive module comprising a disk drive assembly 22 and a disk drive controller 24; and
- a bidirectional shared system bus 26 logically connecting the components 12, 18, 20 of the system. The bus 26 includes separate sets 26a, 26b of conductive lines for carrying addresses and data, respectively, between the components interfaced to it, and lines 26c for providing control signals to these components.

In addition, the CPU 12 has associated with it a bus interface unit 28 which establishes the interface between the CPU 12 and the system bus 26. Likewise, the main memory module 18 has a bus interface unit 30 for establishing its logical connection with the system bus 26. The bus interface units 28, 30 allow the CPU 12 and main memory module 18 to communicate with each other and with other system components interfaced to the bus 26. Since the system bus 26 is shared by all components in the system, the bus protocol provides a mechanism for efficiently allocating bus access among all units which may require it, and also specifies the format of information transferred on the bus 26. A great many standard bus protocols are known and used in the art.

In order for information stored on the disk 20 to be accessible to other components in the system, a hardware and software interface must also be established between the drive 20 and the system bus 26. Referring to FIG. 1, establishing the logical connection between the drive 20 and the bus 26 is one of the functions performed by the host adapter 32. The specific composition and additionally requisite functionality of the host adapter 32 varies depending upon the type of disk drive 20, the bus protocol defined for the system, and the disk driver software executed by the host processor 12, as hereinafter described.

Figure 2:
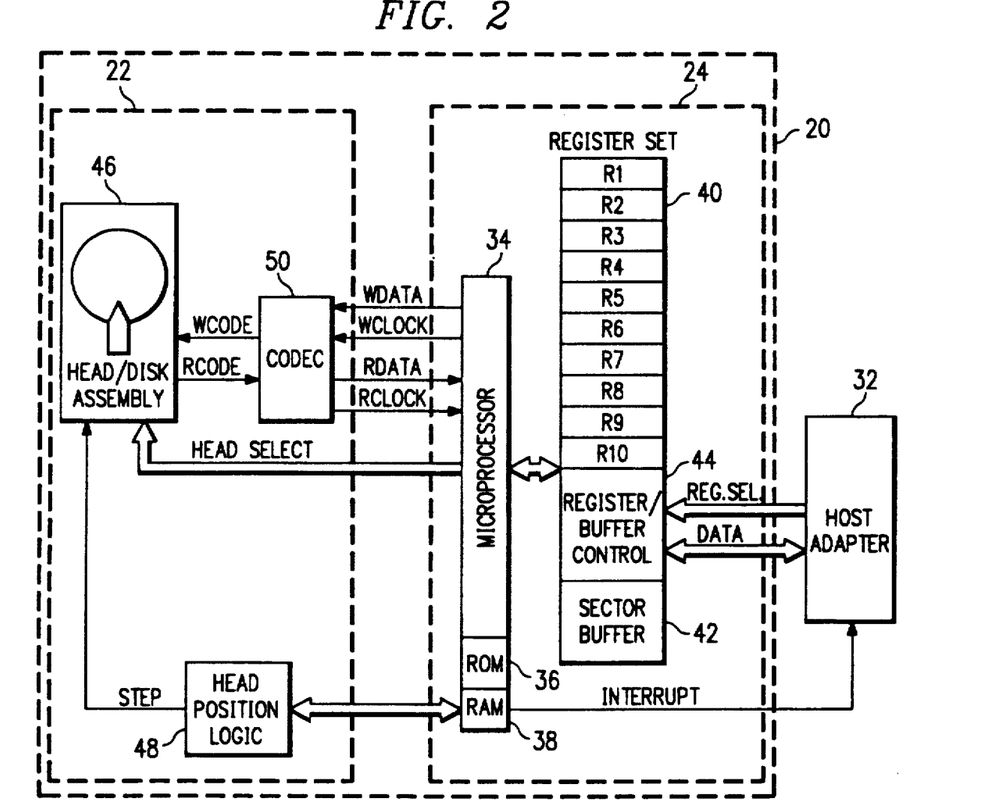
FIG. 2 is a block diagram of the integrated disk drive module in the system of FIG. 1.

FIG. 2 shows a more detailed block diagram of the disk drive module 20. In this embodiment, the disk drive is a Conner Peripherals CP-341 integrated drive, which includes the drive assembly 22 and an embedded controller 24. The disk drive mechanism 22 includes the read/write heads and disk assembly 46, logic 48 for positioning the read/write heads in the disk assembly 46, and logic 50 for encoding and decoding data written to and retrieved from the disk in the disk assembly 46. The drive controller 24 includes a microprocessor 34 such as a standard 8051 8-bit microcontroller device or the like, having local ROM storage 36 and RAM storage 38 for storing the code executed by the microprocessor 34 as it controls the overall operation of the disk drive 20 and for storing data. The disk controller 24 further includes a collection of registers 40, and a data buffer 42. Data transfer into and out of the registers 40 and data buffer 42 is coordinated by register/buffer control logic 44.

The encoding of data by the "Codec" logic 50 before the data is written to the disk is necessary for alleviating undesirable magnetic flux effects arising from high density magnetic storage. The disk assembly 46 consists of one or more magnetic storage surfaces called disks. Each disk has one or more read/write heads which read and store information on the disk surface. Data is stored on the disk surfaces in concentric rings called tracks, which pass under the read/write heads as the disks rotate. Since the read/write heads for all of the disks in the assembly 46 are typically attached to a common arm and move in unison between the center and edge of the rotating disks, the tracks in the same radial position on each of the different disks are grouped together and called a cylinder. Each track consists of a plurality of smaller divisions called sectors, which are the smallest units of data that are transferred between the disk drive and a host computer. The location of a particular sector is fully specified by a cylinder number, a track number, and a sector number.

In a computer system such as the one shown in FIG. 1, a variety of different types of disk drives 20 could be used. The type of disk drive 20 used is determined by the operating system's disk driving software used by the processor 12; or, conversely, the type of disk driving software used by the processor 12 is determined by the type of disk drive installed.

Consider, for example, "register mode" compatible disk driving software requires running on the host processor 12 of FIG. 1. As previously noted, the "register mode" compatible disk driving software requires ten registers to be mapped into certain predefined locations in the processor I/O address space. The processor 12, by executing the disk driver routines, would communicate commands and data to the drive 20, and receive data and other information from the drive 20 via these registers.

Alternately, the disk drive 20 may conform to a block-transfer protocol. If a PS/2 ESDI or ST506 drive or the like were installed in the system of FIG. 1, the disk driving software running on the processor 12 would expect to find a set of registers different from that for the "register mode drive" mapped into a different set of I/O space locations. In addition, the block-transfer compatible disk driving software would expect to exchange information with the disk drive in the form of multiple-word information blocks instead of the single-word formats transferred in registers for "register mode" drives. Clearly, then, "register mode" disk driving software is incompatible with block-transfer drives, and similarly, block-transfer compatible disk driving software is incompatible with "register mode" drives.

According to the present invention, however, a disk drive is provided which selectively supports either an ISA "register mode" type of information exchange or some variety of block-transfer information exchange. A better understanding of the disk drive of the present invention can be obtained by first separately considering the operation of "register mode" and block-transfer drives as included in the system of FIG. 1.

"Register Mode" Drive Operation

Figure 3:
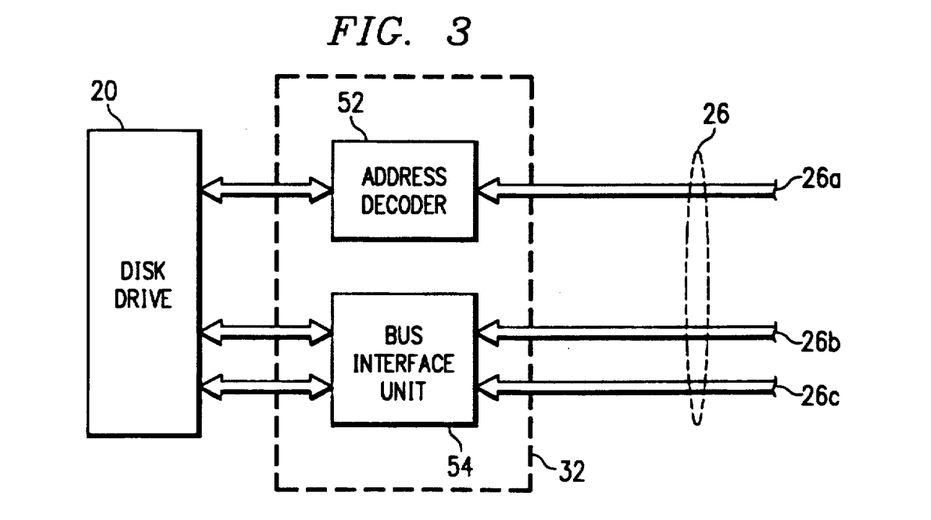
FIG. 3 is a block diagram of the host adapter of FIG. 1.

First, consider the disk drive 20 of FIG. 2 to be a "register mode" drive, and assume that the disk driving software running on the processor 12 is "register mode" compatible. With conventional "register mode" drives, the interface between the drive 20 and the processor 12 is an I/O mapped interface, in which the plurality of registers in the controller register set 40 are mapped into predefined I/O address space locations. The processor module 12 accesses a register in the set 40 by driving the appropriate I/O address on the address lines 26a of the system bus 26, and indicating on one of the system bus control lines 26c that the address is intended to reference a location in the I/O address space (as opposed to the main memory address space) of the processor 12. In the case of a "register mode" drive 20 and "register mode" compatible disk driving software, the host adapter 32 in the system of FIG. 1 would be responsible for detecting the I/O addresses on the system bus 26, and receiving information off of the bus 26 when these addresses are detected. FIG. 3 shows a block diagram of the host adapter 32 required for a conventional "register mode" disk interface. The host adapter 32 consists of an address decoder 52 and a bus interface unit 54. When the decoder detects an I/O address corresponding to a register in the drive controller register set 40, the bus interface unit 54 sends or receives data on the system data bus 26b, either writing or reading the appropriate register in the set 40.

The "register mode" definitions of the ten registers in the register set 40 of the controller 24 are listed in Table 1. The definitions for these registers may be different depending upon whether the processor is writing to or reading from them.

Referring to Table 1, the first register (register R1) is called the Data Port, used to transfer 16 bits of data from the processor 12 to the drive 20, or from the drive 20 to the processor 12. According to this standard interface, register R1 is a 16-bit register, while registers R2 through R10 are 8-bit registers.

Register R2 is called the Error Register when read by the processor 12, and holds information regarding the error status resulting from the latest command executed by the drive 20. When written by the processor 12, register R2 is called the Write Precompensation Register, which provides information to the drive 20 regarding the starting cylinder for the drive's "write precompensation" function. "Write precompensation" techniques are used to overcome subtle magnetic flux "peak shift" effect which arise in high-density storage on magnetic media. Register R3 is called the Sector Count Register when either read or written by the processor 12; this register defines the number of sectors of data to be read or written during execution of a drive command. The value in this register is decremented as each sector is actually read or written by the drive, so that this register always contains the number of sectors left to access in a drive operation. Register R4 is defined as the Sector Number Register for both read and write functions. This register contains the starting sector number for any disk access.

Register R5 is the Cylinder Low Register, and contains the low order eight bits of the starting cylinder number for any disk access. Likewise, register R6 is the cylinder high register, containing the high order eight bits of the starting cylinder number for any disk access. Register R7 is the Drive/Head Register, which contains the specification of drive and head numbers for a disk access. The definitions of R5, R6, and R7 are the same for both reading and writing by the processor 12.

When read by the processor, register R8 is called the Status Register, and contains information regarding the drive/controller status. The contents of this register are updated at the completion of every disk command. When written by the processor, register R8 is the Command Register, which holds the eight-bit code for the command requested by the processor 12. Execution of a command begins immediately after this register is written. Table 2 is a listing of the eleven possible commands that can be issued by the processor 12.

Referring again to Table 1, register R9, when read by the processor 12, contains the same information as in the Status Register R8, and is therefore called the Alternate Status Register. When written by the processor 12, Register R9 is called the Control Bit Register, containing two control bits which enable/disable the disk drive 20, and enable/disable the generation of interrupts by the disk drive 20. Finally, register R10, when read by the processor 12, informs the processor 12 which drive and head are currently selected. Register R10 is not used for writing by the processor.

In order to issue a command to the disk drive module 20, the disk driver software running on the host processor 12 writes the required registers in the register set 40 with the appropriate information, and then writes an opcode into the Command Register R8. When the Command Register R8 is written, the disk controller 24 gets the information out of the registers, interprets it, and performs the requested function.

The standard "register mode" interface defines control signals required to synchronize the transfer of information between the host processor 12 and the disk drive 20. These control signals are used to convey information regarding the direction of data transfer (I/O read or I/O write), the size of information exchanged (eight-bit or sixteen-bit), the selected drive (when more than one is present in the system of FIG. 1), and the operational status of the drive 20 (busy or idle).

Block-transfer Compatible Drive Operation

Next consider the disk drive 20 of FIG. 2 to be a block-transfer compatible drive, and assume that the processor's disk driving software is compatible with the same block-transfer protocol. With block-transfer compatible drives, the communication between the host processor 12 and the drive 20 takes place through the exchange of multiple-word information blocks that are transferred across the host/peripheral interface. The registers in the controller set 40 are used to set up and control the block-transfer of information, but are not used themselves to carry the information, as they were in "register mode". Instead, all information blocks and data are transferred between host and peripheral using techniques of direct memory access (DMA) or other high-speed information transfer methods. Although the number and definitions of the registers 40 under a block-transfer protocol will likely differ from the corresponding number and definitions of registers under the "register mode" protocol, the registers in the disk controller 24 are still I/O mapped. Thus, if the disk driving software executed on the processor 12 is block-transfer compatible, the host adapter 32 will be functionally the same as for the "tranfer mode" drive, consisting, as shown in FIG. 3, of an address decoder 52 and a bus interface unit 54.

For the purposes of illustration, assume that the drive 20 and operating system disk driving software conform to the PS/2 ST506 block-transfer interface protocol or the like. This protocol specifies that a plurality of registers in the drive controller be I/O mapped into a particular set of I/O addresses, and defines a particular interpretation of the contents of these registers. As in the case of the "register mode" protocol, the contents of the I/O mapped registers 40 may be interpreted differently depending upon whether they are read or written.

Operation of a block-transfer drive, such as one which conforms to the PS/2 ST506 protocol, proceeds generally as follows: The operating system disk driving routines execute a data transfer by first writing set up information into appropriate registers 40 in the I/O mapped interface. This information includes details of the direction of transfer (from host to peripheral or from peripheral to host), the word size of the transfer (either 16-bit transfers, or 8-bit transfers), the drive to use for the transfer, the size and type of information block to be transferred (either a Status block, a parameter block, or a Command block), as well as information about disk drive errors and status. Once this information has been specified for the controller 24, the disk driving software requests the block-transfer by writing a "data transfer request" to one of the registers in the set 40. The drive controller 24, in turn, reads the I/O mapped registers 40 to determine the intended nature of the block-transfer. The controller microprocessor 34 determines the appropriate interpretation of the contents of the registers 40 by consulting code stored in its ROM 36 or loaded into its RAM 38 from disk. After determining what operation has been specified in the registers 40, the controller 24 initiates the requested transfer (in cooperation with the bus interface unit 54), which takes place in the form of multiple-word DMA transfer to or from main memory 18, moving data into or out of the controller data buffer 42.

By transferring information between the host 12 and the drive 20 in this manner, the interface does not restrict the amount of information to be contained in the small set of registers 40. Instead, information blocks can be as large as necessary, and the registers 40 are used merely to coordinate and control the actual transfer of information.

"Flex mode" Drive Operation

As noted above, a disk drive according to this embodiment of the present invention is mode-selectable to operate either in "register mode", or in a block-transfer mode called "flex mode". When operating in "flex mode", the disk drive can be used with an accompanying host adapter to emulate a variety of different block-transfer protocols, as hereinafter described. A mode-selectable drive conforming to the present invention can be applied in a number of different situations without requiring modification to the drive hardware interface or programming. The requirements for implementing a "flex mode" drive depend upon the type of disk driving software to be used, as hereinafter explained.

By way of illustration, assume that the disk drive 20 of FIG. 2 is a "flex mode" drive which functions in accordance with the present invention. The disk drive 20 consists of a disk head assembly 22 and a disk controller 24. The controller 24 contains a local controlling microprocessor 34 having both local ROM storage 36 and local RAM storage 38, a set of ten registers 40, a data buffer 42, and register/buffer controlling logic 44. When selected to operate in "register mode", the drive controller microprocessor 34 reads routines from its internal ROM storage 36 (or from internal RAM 38 if the routines have been brought into the controller from external storage) which provide appropriate information for controlling "register mode" operation. In this case, the registers in the set 40 are defined exactly as described above for conventional "register mode" drives. When selected to operate in "flex mode", however, the controller microprocessor 34 executes a different set of routines from ROM 36 (or ones loaded into RAM 38 from external storage) which interpret the contents of the ten registers 36 differently than if the drive were operating in "register mode". Furthermore, since the disk drive 20 in "flex mode" will transfer information in multiple-word blocks, the format and meaning of each of the blocks to be transferred must also be predefined in the RAM 38 or ROM 36 code of the controller microprocessor 34, so that the controller 24 will accept and interpret the information in these blocks correctly, and in a manner consistent with the disk driving software's intentions.

In one embodiment of the present invention, a drive operating in "flex mode" uses the register set definitions shown in Table 3. Note that in most cases, the "flex mode" definitions for the registers 40 are different than the corresponding "register mode" definitions.

Referring to Table 3, in "flex mode", register R1 is the Data Port, through which all command, status, parameter and configuration information is passed in the form of variably sized information blocks. In addition, all data read from or written to the drive is transferred via Data Port register R1. When in "flex mode", the block transfers through this port are accomplished as a number of consecutive high-speed 16-bit DMA cycles, regardless of the type of information being transferred. As in "register mode", register R1 is a 16-bit register, while registers R2 through R10 are 8-bits wide. The definition of register R1 is the same for reads and writes by the host processor 12.

Figure 4A:
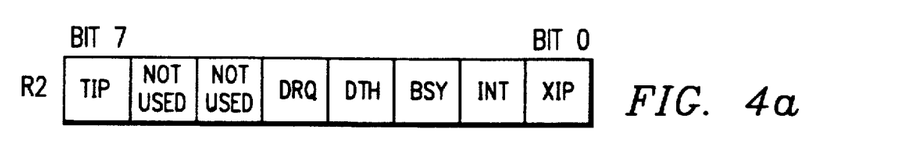
FIGS. 4a-4e are a collection of diagrams showing the format of certain registers in the register set of the disk drive module of FIGS. 1 and 2.

When written by the drive 20, registers R2 and R3 are re-defined under the "flex mode" protocol to contain the least-significant byte (LSB) and most-significant byte (MSB), respectively, of a 16-bit Operation Status Word. These registers may be loaded several times during an operation, depending on the function being performed. For example, during a multiple-sector read operation, the registers R2 and R3 are loaded in response to the initiation of the operation, again at the start of each sector transfer, at any point where an error is encountered, and again at the completion of the multi-sector transfer. After the registers R2 and R3 are written by the drive, an interrupt to the host adapter 32 is generated to notify the host that the status has been updated. FIG. 4a shows the format and information content of the Operation Status LSB register R2. All bits in register R2 are considered valid to the host adapter 32 whenever the controller generates an interrupt. The bits in the Operation Status LSB Register R2 are defined as follows:

TIP (register R2, bit-7)
This is the "test in progress" bit, which is set upon drive reset or startup and is reset only after the controller has successfully completed a self-test. Under normal, non-error conditions, this bit is never set.

DRQ (register R2, bit-4)
This is the "data request bit", set when an operation being performed by the controller 24 requires information blocks or data to be transferred to or from the host processor 12. It also signals that a valid transfer count is loaded in the transfer count registers (R4, R5) and host processor data transfers are enabled or should be initiated by the host processor 12.

DTH (register R2 bit-3)
This is the "direction to host" bit, and is valid only when the DRQ bit is set. DTH should be set if the data transfer direction is to the host, and reset if the direction is to the controller.

BSY (register R2, bit-2)
This is the host adapter "busy bit". BSY is set at various times during operation, when the host adapter 32 is busy.

INT (register R2, bit-1)
INT is the host interrupt bit, set during operation execution when the host processor is to be interrupted, as hereinafter described.

XIP (register R2, bit-0)
This is the "transfer in progress" bit, set at various times during execution when the host processor must recognize that a transfer is in progress.

Bit-5 and bit-6 of the Operation Status Register R2 are unused.

Figure 4B:
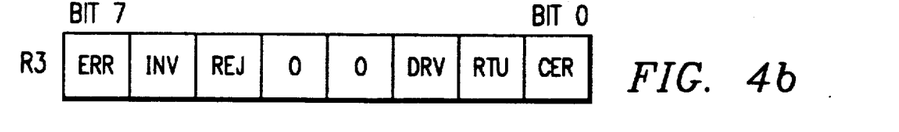

Register R3, when read by the processor 12, is the most-significant byte of the Operation Status Word, and contains controller status information at the completion of an operation. FIG. 4b shows the format and content of register R3. The bits in the Operation Status MSB Register R3 are defined as follows:

ERR (register R3, bit-7)
This is the "error" bit, set when an error has occured during execution of an operation.

INV (register R3, bit-6)
INV is the "invalid command block" bit, set when an invalid request for an I/O transfer is encountered. Such a case exists when parameters specified for a command are out of range with respect to the current drive parameters.

REJ (register R3, bit-5)
This is the "rejected operation" bit, set when the requested operation cannot be performed due to a drive error condition.

DRV (register R3, bit-2)
DRV is a copy of the drive select bit, which is specified as hereinafter described with a request for drive action.

RTU (register R3, bit-1)

RTU is the "retries used" bit, set when retries or other methods of error recovery have been used in an attempt to complete an operation. IF the retries were successful, no other bits in register R3 will be set.

CER (register R3, bit-0)
This is the "controller error" bit, set when the controller 24 has encountered an internal error when performing an operation.

Figure 4C:
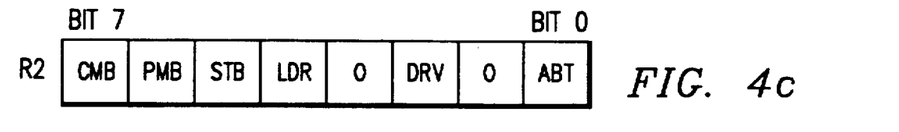

When written by the processor 12, the registers R2 and R3 are defined as the least-significant byte and most-significant byte, respectively, of the Action Register. The Action Register has two distinct functions: to specify an operation to be performed by the controller, and to select the drive's operation mode. As shown in FIG. 4c, the register R2 contains bits or codes which request a subsequent transfer of command, status, parameter, or configuration information, and which specify other actions which the controller is to perform. In particular, the format and meaning of bits in the Action Registere LSB R2 are defined as follows:

CMB (register R2, bit-7)
This is the "command block request" bit, which, when active signals that a command block is to be transferred to the controller. The CMB bit may be set in conjunction with the LDR bit (register R2, bit-4) to automatically enable data transfers following command block transfer and execution.

PMB (register R2, bit-6)
This is the "parameter block request" bit, which, when active, signals that a parameter block is to be transferred to the controller 24.

STB (register R2, bit-5)
This is the "status block request" bit, which, when active signals that a status block is to be transferred to the host processor 12.

LDR (register R2, bit-4)
As noted above, the "linked data request" bit is set in conjunction with the CMB bit (register R2, bit-7). When both bits are set, the controller 24 transfers a command block and the data from the operation without waiting for an intervening write to the Action Registers R2, R3. LDR may also be set by a separate Action Register write after the command block has been transferred.

DRV (register R2, bit-2)
DRV is the drive bit, which specifies the drive on which an operation is to be performed. DRV selects drive 0 when inactive, drive 1 when active. This bit is copied into the DRV field of the Operation Status MSB (register R3, bit 2).

ABT (register R2, bit-0)
ABT is the "abort operation" bit. If set, any operation in progress is aborted.

Register R2, bit-1 and bit-3 are unused in this embodiment. Likewise, register R3, the Action Register MSB is unused.

Figure 4D:
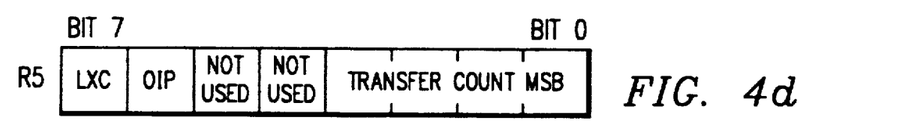

When the host adapter 32 reads registers R4 and R5, on behalf of the host processor 12, these registers contain the least-significant bits and most-significant bits of the number of words of information to be passed between host 12 and controller 24. The transfer count value held in these registers is written by the controller 24 prior to starting a transfer, and may be loaded several times during an operation, depending on the function being performed. While register R4 is called the Transfer Count LSB Register, which contains the least significant byte of the transfer count, register R5 contains only the remaining higher-order four bits of this value, and additionally contains two other bits for use by the host adapter 32, as shown in FIG. 4d. The meaning of these bits defined as follows:

LXC (register R5, bit-7)

This is the "load transfer count" bit. When activated by the controller 24, it signals that a valid transfer count is loaded in the Transfer Count registers R4, R5, and host data transfers are enabled or should be initiated.

OIP (register R5, bit-6)

OIP is the "operation in progress" bit, set as soon as an operation in begun, and not reset until the operation is complete.

Registers R4 and R5 are not used for writing by the host processor 12.

Register R6 is not used for "flex mode" operation. Register R7 is called the Drive Select Register, and is used to hold the 1-bit drive number (register R7, bit-4) for the drive on which a function is to be performed. Register R7 can be both read and written by the host adapter 32.

Figure 4E:
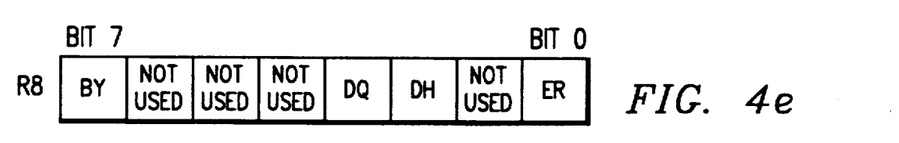

When read by the host processor 12, register R8 is called the Drive Status Register, containing bits describing the status of the drive controller and updated once or more times during the execution of a drive command. The format and content of the Drive Status Register R8 is shown in FIG. 4e. The definitions for the bits in R8 are as follows:

BY (register R8, bit-7)

This is the "busy" bit, which is set whenever the drive is performing an operation. If this bit is set, information in the registers R1 through R7 should not be considered valid.

DQ (register R8, bit-3)

DQ is the "data request" bit, which indicates that the drive is ready for transfer of a word of data from the Data Port (register R1). All data transfers should be qualified by this bit being set prior to the transfer.

DH (register R8, bit-0)

DH is the information transfer direction bit, which specifies the direction in which the controller is prepared to transfer data. When set, the DH bit specifies data is to be transferred to the host, when reset data is to be transferred to the controller.

ER (register R8, bit-0)

This is the error bit, which indicates that the drive failed its self-test, is unable to enter "flex mode", or other catastrophic error conditions have been detected.

When written by the host processor 12, register R8 is called the Opcode Register, used by the host to specify which operation the drive should perform. In "flex mode" only two possible operations can be specified: the "set flex mode" operation, and the "service action register" operation. The "set flex mode" operation configures the drive to operate in either the "register mode" or in the "flex mode". Prior to issuing this opcode, the host processor should load the Action Register least-significant byte (register R2) with either the hexidecimal byte $(AA) to enable "flex mode", or $(55) to disable "flex mode". The "service action register" opcode directs the controller 24 to interrogate the Action Registers (registers R2 and R3) for an operation request that is loaded there, and to perform the requested operation. Prior to issuing this opcode, the Action Registers should be written with the bit or bits that correspond to the desired operation and the drive select register R7 should be written to select the desired drive.

Register R9 is available for writing by the host processor, and is called the Control Bit Register. As in "register mode", the Control Bit Register is used by the host processor 12 to enable or disable the disk drive interrupt output pin. Register R9 is not used for writing by the controller 24. Register R10 is not used at all in "flex mode" communication.

As noted above, a "flex mode" disk drive conforming to the present invention can operate either in "register mode" or in "flex mode". The Action Register LSB (register R2) is used to establish the drive's operational mode as follows: First, the byte value $(AA) is written into Register R2. Next, the "set flex mode" opcode is written to the Opcode Register R8. Upon writing Register R8 with this opcode, the drive controller loads the "flex mode" controller code into the controller RAM, and the drive 20 becomes operational in "flex mode". If any value other than $(AA) is first loaded into Register R2, the drive 20 will enter "register mode" upon writing the "set flex mode" opcode to Register R8.

In addition to predefining the interpretation of the contents of the ten registers 40 in the "flex mode" drive controller 24, a definition of the format of information blocks must also be provided, so that the ROM or RAM code executed by the controller microprocessor 34 can correctly receive and process the information blocks.

In one embodiment of the present invention, three different types of information blocks are defined. These are: command blocks, which fully specify operations to be performed by the drive 20; parameter blocks, which contain information which enables the controller 24, and sets various operational parameters for the drive 20; and status blocks, which contain information reflecting the controller and drive status during and at the completion of disk drive operations.

Figure 5:
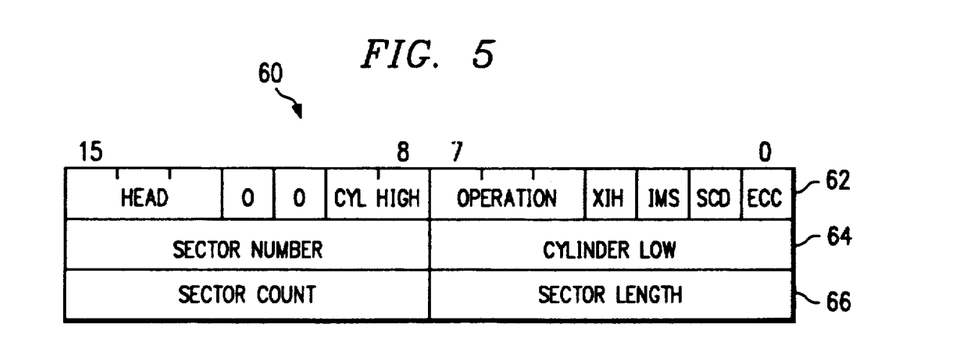
FIG. 5 is a diagram of the format of a command information block transferred between the processor and drive in the system of FIGS. 1 and 2.

FIG. 5 shows the format of a command block 60 as defined in this embodiment. In this format, a command block consists of three 16-bit words 62, 64, 66. The four-bit field from bit-12 through bit-15 of the first command block word 52 is used to specify which read/-write head in the drive assembly 46 is to be used for execution of the current command. Bit-8 and bit-9 are the high-order two bits of the binary number corresponding to the cylinder on the disk which is to be read or written. The low-order byte (eight bits) of the cylinder value is located in bit-0 through bit-7 of the second command block word 64. Bit-4 through bit-7 of the first command block word 62 is a four-bit field used to specify one of sixteen possible operations to be performed by the drive. Table 4 is a listing of these sixteen commands, along with their corresponding operation codes. Bit-0 of the first command block word 62 is used to select which form of error handling functionality is to be employed by the drive 20. In this embodiment, the "ECC" bit (word 62, bit-0) can select either "Error Correction Code" or "Cyclic Redundancy Checks" as methods of error detection and/or correction. Bit-1 of the command block word 62 is the "skip controlled data" bit, which, when asserted, indicates that data on the disk that is specified as "controlled" data should be ignored. Bit-2 in word 62 is the "implied seek enable" bit, which when set indicates that the drive should automatically position its head over the appropriate cylinder on the disk, without waiting for an explicit command to do so. Bit-3 of word 62 is the "transfer inhibit bit".

The high-order byte (bit-8 through bit-15) of the second command block word 64 specifies for the drive the starting sector on the disk that is to be read or written during execution of the current command. The high-order byte of the third command block word 66 contains the number of sectors including the starting sector that are to be read or written. Finally, the low-order byte (bit-0 through bit-7) of the third command block word 64 specifies a code corresponding to the actual length of the selected sector on the disk, in bytes.

Upon receipt of a command block 60, the controller 24 first interrogates it to determine if it is valid for the specified drive. This operation is done in the microprocessor 34 by storing the command block in the sector buffer 42, executing routines stored in RAM 38 or ROM 36 to perform the functions explained herein. The types of validity checks that are performed depend on the operation modifier bits in the command block 60 (command block word 62, bit-0, bit-1, bit-2, and bit-3), and on the status of the "linked data request (LDR) bit (register R2, bit-4) in the Action Register LSB when the command block request is made.

When the "implied seek" modifier bit (IMS, word 62, bit-2) is reset, no range checking of the requested cylinder and head is performed. However, if the IMS (word 62, bit-2) is set, the requested head is checked against a maximum head value stored, as hereinafter described, in a parameter block and, if out of range, the error is reported immediately. The requested head being out of range is reported as soon as the command block 60 is interrogated, regardless of the status of the LDR bit (register R2, bit-4). The requested cylinder range is similarly checked, when IMS (word 62, bit-2 is set), but a cylinder that is out of range is not reported until after the LDR bit (register R2, bit-4) is set; if LDR (register R2, bit-4) is set in a separate Action Register write after the command block request, the out of range cylinder is not reported until LDR (register R2, bit-4) is set.

Other command block checks that are made and reported immediately to the host processor 12 are: a sector count of zero on disk data transfer operations, "transfer inhibit" (XIH, command block word 62, bit-3) requested when the sector count is not one, and a sector length code greater than three. An error in any of the command block validity checks causes the controller 24 to set the ERR (register R3, bit-7) and INV (register R3, bit-6) bits in the Operation Status MSB Register (R3) to be set, causes the BY (register R8, bit-7) bit in the Drive Status Register (R8) to be reset, causes an interrupt to the host processor 12 to be generated, and causes the operation in progress to be terminated.

If the command block 60 is found to be valid, execution of the requested operation is begun with the controller 24 proceeding as hereinafter described for the specific operation requested.

Figure 6:
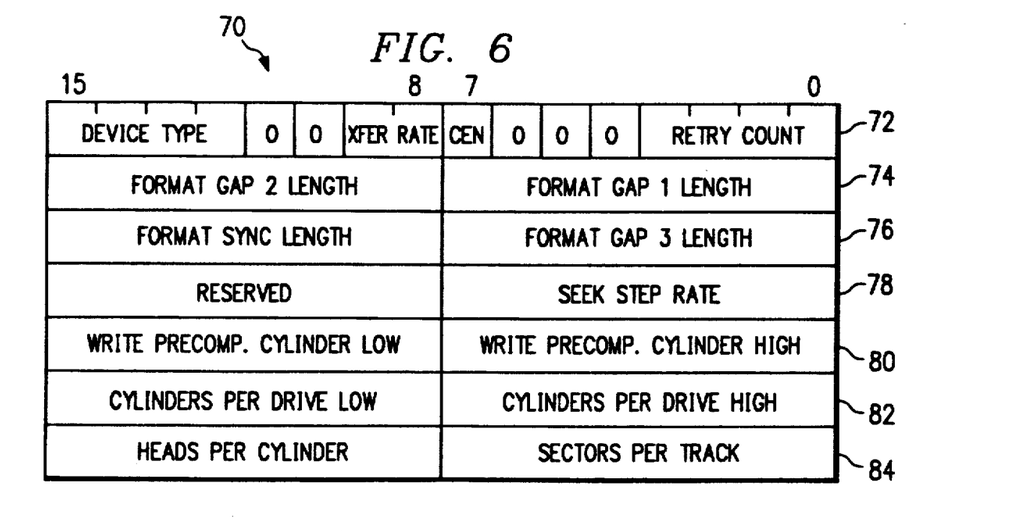
FIG. 6 is a diagram of the format of a parameter information block transferred between the processor and drive in the system of FIGS. 1 and 2.

FIG. 6 shows the format of a parameter block 70 as used in this embodiment. A parameter block 70 consists of seven 16-bit words 72, 74, 76, 78, 80, 82, 84. The information in the parameter block 70 enables the controller, sets the retry count, the controller type, and the data transfer rate. In addition, this block enables the drive to set its configuration, including the number of cylinders per drive, heads per cylinder and sectors per track. The 4-bit field from bit-12 to bit-15 of the first parameter block word 72 are used to specify the type of disk controller 24 that is used in a particular configuration. Bit-8 and bit-9 of word 72 specify one of four standard data transfer rates to be used by the drive.

Bit-7 of parameter block word 72 is used to indicate the enabling or disabling of the disk controller 24. Bit-0 through bit-3 of word 72 specify how many times the drive should retry to access a location that is not successfully read or written during a first attempt. The high-order byte (bit-8 through bit-15) and low-order byte (bit-0 through bit-7) of the sixth parameter block word 82 contain the low-order byte and high-order byte, respectively, of the number of cylinders per drive. The high-order byte (bit-8 through bit-15) of the seventh parameter block word 84 holds the number of heads per cylinder in the drive assembly 46, while the low-order byte (bit-0 through bit-7) of word 84 holds the number of sectors per track.

As shown in FIG. 6, a number of other fields are available for use in the parameter block 70. This embodiment, however, does not utilize these other fields, although one particular application of these fields is suggested in FIG. 6.

Figure 7:
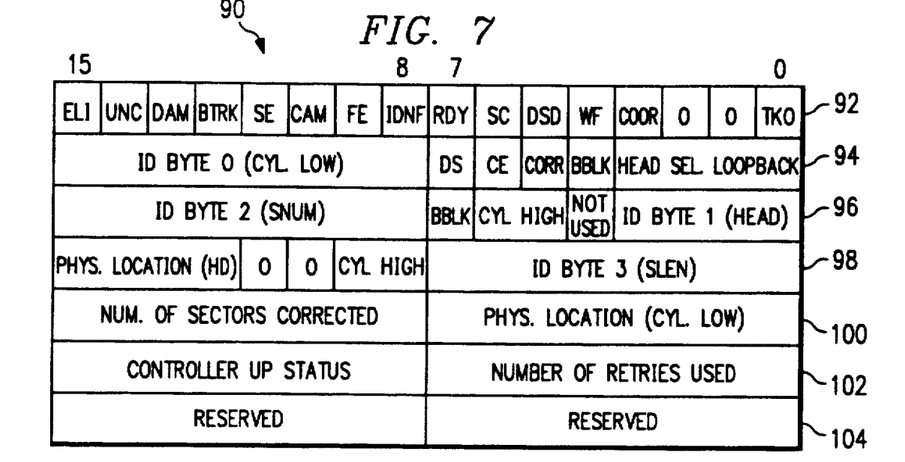
FIG. 7 is a diagram of the format of a status information block transferred between the processor and drive in the system of FIGS. 1 and 2.

FIG. 7 shows the contents of a status block 90 according to this embodiment consisting of seven 16-bit words 92, 94, 96, 98, 100, 102, 104. A copy of the status block 90 is constantly maintained in a reserved portion of the sector buffer 42 in the drive controller 24, so that up-to-date status information can be made available to the host processor 12 at any time. Of the fields shown in FIG. 7, some are changed in a "real-time" manner during drive operation, and some are not. The real-time fields are updated by the drive controller 24 after every command block 60 that is passed to the controller for execution, while the non-real-time fields are updated only if processing the requested operation is actually begun. If any part of the command block 60 is found to be invalid during initial range checks, the real-time fields in the status block 90 are updated, appropriate error bits are set in the Operation Status Registers R2 and R3, but the non-real-time fields are left unchanged.

Referring to FIG. 7, the real-time fields in the status block 90 and their definitions are as follows:

CONTROLLER UP STATUS (Word 102, bit-8 through bit-15)
  This field reflects microprocessor 34 execution progress, which is updated after each phase of an operation is successfully completed.
RDY (word 92, bit-7)
  Indicates drive ready.
SC (word 92, bit-6)
  Indicates seek complete.
DSD (word 92, bit-5)
  Indicates drive selected.
WF (word 92, bit-4)
  Indicates write fault.
TKO (word 92, bit-0)
  Indicates that the drive heads are currently positioned over track zero, cylinder zero.
ID BYTE 0 (word 94, bit-8 through bit-15)
ID BYTE 1 (word 96, bit-0 through bit-3)
ID BYTE 2 (word 96, bit-8 through bit-15)
ID BYTE 3 (word 98, bit-0 through bit-7)
  These fields identify the last sector on which an access was attempted. These bytes are not updated if the requested operation does not require disk access.

The non-real time fields in the status block 90 are all remaining fields, including:
COOR (word 92, bit-3)
  Indicates "requested cylinder out of range" error.
ELI (word 92, bit-15)

Indicates a ECC or CRC error located in the ID field (if ELI=1) or in the data field (if ELI=0).

UNC (word 92, bit-14)

Indicates an "uncorrectable" error.

DAM (word 92, bit-13)

Indicates a "data address mark not found" error.

BTRK (word 92, bit-12)

Indicates that an entire track is bad.

SE (word 92, bit-11)

Indicates a "seek" error.

CAM (word 92, bit-10)

Indicates that a controlled data address mark was detected.

FE (word 92, bit-9)

Indicates a "format" error.

IDNF (word 92, bit-8)

Indicates an "ID not found" error.

DS (word 94, bit-7)

Drive select loopback bit, which indicates which drive has been selected in the Drive Select Register R7.

CE (word 94, bit-6)

Indicates a "controller" error.

CORR (word 94, bit-5)

Indicates corrected data.

BBLK (word 94, bit-4)

Indicates a bad sector detected.

NUMBER OF RETRIES USED (word 102, bit-0 through bit-7)

NUMBER of SECTORS CORRECTED (word 100, bit-8 through bit-15)

PHYS LOCATION (HEAD) (word 98, bit-12 through bit-15)

This field identifies the currently selected drive read/write head.

PHYS LOCATION (CYL. LOW) (word 100, bit-0 through bit-7)

This field contains the low-order byte of the cylinder at which the drive read/write heads are currently located.

PHYS LOCATION (CYL. HIGH) (word 98, bit-8 through bit-9)

This field contains the high-order two bits of the cylinder at which the drive read/write heads are currently located.

HEAD SEL LOOPBACK (word 94, bit-0 through bit-3)

This field contains the head select bit pattern that is currently being output to the drive.

Recall that Table 4 is a listing of the sixteen possible commands that can be entered in the OPERATION field (word 62, bit-4 through bit-7) of a command block 60, along with their corresponding 4-bit codes. Operation of the drive 20 in "flex mode" according to this embodiment of the invention can be more fully appreciated by considering the effect of several of these commands.

READ command

The READ command will cause from one to two hundred fifty-five sectors to be read from the disk, as specified in the Sector Count field (word 66, bit-8 through bit-15) of the command block 60, beginning at the sector identified by number in the Sector Number field (word 64, bit-8 through bit-15). All four modifier bits (word 62, bit-0, bit-1, bit-2, bit-3) are valid for this operation.

A read is initiated by setting the "command block request" (CMB) bit in the Action Register (register R2, bit-7). The "linked data request" (LDR) bit (register R2, bit-4) may also be set at the same time, or may be set after the operation has been partially completed and the controller is not busy. If LDR is not set along with the CMB bit, the read will complete to the point just prior to the transfer of data to the host processor 12, but the data transfer will not be initiated. With the data waiting in the controller data buffer 42, the controller 24 will load the Operation Status Registers (R2, R3), reset the "busy" (BY) bit (register R8, bit-7), and generate an interrupt, as if the operation were complete. Upon servicing the Action Register (R2) the next time, the controller must find that the host adapter 32, has set the LDR bit (register R2, bit-4). When this occurs, the controller will set the "busy" (BY) bit (register R8, bit-7), load the Transfer Count LSB (register R4), load the Transfer Count MSB (register R5, bit-0 through bit-3), set the "load transfer count" (LXC) bit (register R5, bit-7), reset the "busy" (BY) bit (register R8, bit-7), generate an interrupt to the host adapter 32, and wait for the host to take the data through the "data port" (register R1). When the data has been transferred, the controller will set the "busy" (BY) bit (register R8, bit-7), update any status block fields that have changed, update the Operation Status Registers (R2, R3), reset the "busy" (BY) bit (register R8, bit-7), and generate an interrupt to the host adapter 32.

If the "linked data request" (LDR) bit (register R2, bit-4) is set at the same time as the "command block request" (CMB) bit (register R2, bit-7), read operation processing will include the data transfer, without the additional Action Register write described above. In this case, the final update to the status block fields and the Operation Status Registers (R2, R3) takes place prior to the data transfer and the controller will not set the "busy" (BY) bit (register R8, bit-7) again, nor will it generate another interrupt after the data transferred.

Execution of a read command begins when the command block containing the command code for a "READ" operation in the "operation" field (command block word 62, bit-4 through bit-7) is found to be valid. If the drive heads are not already positioned over the desired cylinder, or the appropriate head is not selected, and the "implied seek" (IMS) modifier bit (word 62, bit-2) is set, a seek to the desired cylinder and head is performed. If the IMS bit (word 62, bit-2) is not set, the read is attempted on the current track regardless of the actual physical location of the heads.

Reading begins by searching for the appropriate ID field corresponding to the sector number, head number, and cylinder number specified in the command block. ID read attempts continue until the retry count, as specified in the "retry count" field of the parameter block (parameter block word 72, bit-0 through bit-3), is exhausted, or the ID is successfully read from the disk. Reads which are unsuccessful because an ID with the requested cylinder bits cannot be found are reported by updating all status block fields and by setting the "ID not found" (IDNF) and "seek error" (SE) bits (status block word 92, bit-8 and bit-11, respectively). Reads which fail because the requested sector length does not match the physical sector length or the ID cylinder bits match the requested cylinder but the head bits don't match the requested head, cause the status block to be updated to reflect only "ID not found" (by setting the IDNF bit, status block word 92, bit-8). Reads which fail because of a CRC or ECC error in the ID field set the IDNF bit (word 92, bit-8) and "error located in ID" (ELI) bit (word 92, bit-15).

If the ID is read correctly from disk, a data address mark must be recognized before the starting point of the next sector, or the "data address mark not found" (DAM) bit (word 92, bit-13) in the status block will be set. Once the data address mark is found, a data field read is attempted. If the ECC modifier bit (command block word 62, bit-0) is not set, the "error located in ID" (ELI) bit (word 92, bit-15) will be reset and the "uncorrectable data" (UNC) bit (word 92, bit-14) will be set, along with an update of all other status block fields. True data errors that occur on reads are reported as either "uncorrectable" (by setting the UNC bit, word 92, bit-14) or "corrected"; (by setting the CORR bit, word 94, bit-5) along with ELI (word 92, bit-15) being reset and the "number of retries used" field (status block word 102, bit-0 through bit-7) being updated.

When the data has been read from the disk into the controller sector buffer 38 and is ready to be transferred to the host, the controller updates the Operation Status LSB and MSB Registers (R2, R3), loads the Transfer Count LSB and MSB (register R4, and register R5 bit-0 through bit-3, respectively), sets the "data request" (DQ) and "information transfer direction" (DH) bits in the Drive Status Register (register R8, bit-3 and bit-2, respectively), and generates an interrupt to the host adapter 32.

Multiple sector reads set the "data request" (DRQ) bit (register R2, bit-4), the "load transfer count" (LXC) bit (register R5, bit-7), the "direction to host" (DTH) bit (register R2, bit-3), the "transfer direction" (DH) bit (register R8, bit-2), and the data request" (DQ) bit (register RB, bit-3); and then generate an interrupt to the host adapter 32 when the controller sector buffer 42 is filled after each sector is read from disk and the controller is ready to send data. The "data request" (DQ) bit is reset and the "busy" (BY) bit is set immediately after each sector has been read from the buffer into memory by the host processor 12. If any error other than a corrected data error occurs during a multiple sector read, the read will terminate at the sector where the error occurs. Corrected data errors do not terminate multiple sector reads. At the completion of the operation, the status block should be updated to contain the cylinder, head, and sector number of the sector where the error occurred. If an error does occur, flawed data is not transferred to the host.

READ VERIFY command

The processing of a READ VERIFY command is identical to that of the READ command, except that no data is transferred to the host. The controller sets the "busy" (BY) bit (register R8, bit-7) as soon as the command block is received and resets this bit and generates an interrupt when the requested sectors have been verified, or in the event of an error.

If any error other than a corrected data error occurs during a multiple sector verify, the command will terminate at the sector where the error occurs. The status block will be updated to contain the cylinder, head, and sector number of the sector where the error occurred. Corrected data errors will not terminate multiple sector verify operations.

RECALIBRATE command

This operation will move the read/write heads in the drive assembly 46 from anywhere on the disk to cylinder zero, head zero. The controller 24 issues a seek to cylinder zero, and then waits for the seek to complete before updating the status block, setting the "track zero" (TKO) bit (status block word 92, bit-0) if the operation was successful, resetting its "busy" (BY) bit (register R8, bit-7), and generating an interrupt to the host processor 12.

WRITE command

This operation will write from one to two hundred fifty-five sectors as specified in the command block, beginning at the specified sector. The ECC, XIH, and IMS modifier bits (command block word 62, bit-0, bit-3, and bit-2, respectively) are valid for this operation, and the SCD bit (word 62, bit 1) is invalid. If the SCD bit (word 62, bit-1) is set, the operation is terminated with the ERR and INV bits (register R3, bit-7 and bit-6, respectively in the Operation Status MSB Register R3 set.

A write is initiated by setting the "command block request" (CMB) bit in the Action Register LSB (register R2, bit-7). The "linked data request" (LDR) bit in the Action Register LSB (register R2, bit-4) may also be set at the same time, or may be set after the operation has been partially completed and the controller 24 is not busy. If LDR (register R2, bit-4) is not set along with the CMB bit (register R2, bit-7), the write will complete to the point just prior to transferring the data from the host processor 12 into the controller data buffer 42, not including an implied seek, if enabled, but the data transfer will not be initiated. The controller 24 will load the Operation Status Registers (R2, R3), reset its "busy" (BY) bit (register R8, bit-7) and generate an interrupt, as if the operation were complete. Upon servicing the Action Register (R2) for the next time, the controller 24 must find the LDR bit (register R2, bit-4) set, indicating that the transfer should be initiated.

When the LDR bit (register R2, bit-4) is set, the controller 24 will set its "busy" (BY) bit (register R8, bit-7), load the Transfer Count LSB and MSB (register R4, and register R5 bit-0 through bit-3, respectively), update the Operation Status LSB and MSB Registers (R2, R3, respectively), set the "load transfer count" (LXC) bit (register R5, bit-7), the "data request" (DQ) bit (register R8, bit-3), reset the "direction to host" (DTH) bit (register R2, bit-3), the "transfer direction" (DH) bit (register R8, bit-2), and the "busy" (BY) bit (register R8, bit-7), generate an interrupt and wait for the host to send the data into the controller sector buffer 42 via the Data Port (register R1). When the data has been transferred, the controller 24 will set its "busy" (BY) bit (register R8, bit-7), and write the data to the disk, then generate an interrupt to the host adapter 32, which will forward this interrupt to the host processor 12.

If the "linked data request" (LDR) bit (register R2, bit-4) is set at the same time as the "command block request" (CMB) bit (register R2, bit-7) in the Action Register LSB (R2), write operation processing will include the data transfer, without a subsequent Action Register write as described above.

Writing, like reading, begins by searching the disk for the appropriate ID field. ID read attempts continue until the retry count, as specified in the "retry count" field in the parameter block (parameter block word 72, bit-0 through bit-3), is exhausted, or the ID is successfully read.

Writes which are unsuccessful because an ID with the requested cylinder bits cannot be found are reported to the host processor 12 by updating all status block fields and by setting the "ID not found" (IDNF) bit (status block word 92, bit-8) and "seek error" (SE) bit (status word 92, bit-11). Writes which fail because the requested sector length does not match the physical sector length or the ID cylinder bits match the requested cylinder but the head bits do not match the requested head, cause the status block to be updated and report only "ID not found" (by setting IDNF, status block word 92, bit-8). Writes which fail because of a CRC or ECC error in the ID field set IDNF (word 92, bit-8) and ELI (word 92, bit-15).

If the ID is read correctly, a data address mark is written, followed by the data field, and the ECC bits. ECC bits are written following the data field regardless of the state of the ECC bit (command block word 62, bit-0) in the command block.

Multiple sector writes set the "data request" (DRQ) bit (register R2, bit-4), the "load transfer count" (LXC) bit (register R5, bit-7) and the "data request" (DQ) bit (register R8, bit-3), reset the "direction to host" (DTH) bit (register R2, bit-3) and "transfer direction" (DH) bit (register R8, bit-2), and generate an interrupt when the controller sector buffer 42 is ready to be filled at the beginning of each sector, and the controller 24 is ready for data to be sent by the host via the Data Port (register R1). The "data request" (DQ) bit (register R8, bit-3) is reset and the "busy" (BY) bit (register R8, bit-7) is set immediately when the host fills the sector buffer 42. Any error that occurs during a multiple sector write will terminate the operation at the sector where the error occurs. At the completion of the operation, the status block should be updated to contain the cylinder, head, and sector number of the sector where the error occurred.

SEEK command

The SEEK operation initiates a seek to the track and selects the head specified in the command block. The drive need not be formatted for a seek to execute properly, as no reading is performed once the seek is complete to verify correct positioning. When the command is issued, the controller 24 sets its "busy" (BY) bit (register R8, bit-7), initiates the seek, resets its "busy" bit (register R8, bit-7) and generates an interrupt. The controller 24 does not wait for the seek to complete before returning the interrupt. If a new command is issued to the drive while a seek is being executed, the controller 24 will wait, with its "busy" (BY) bit (register R8, bit-7) active, for the seek to complete before executing the new command.

"Flex mode" Emulation of Block-transfer Drives

While the definitions of the register set 40 and information blocks 60, 70, and 90 described above may not exhaustively support the functional capabilities of all disk drives or disk driving software, a "flex mode" disk drive having internal RAM or ROM programming corresponding to the above information block and register set definitions can be used, in conjunction with various host adapters, to emulate a wide range of disk drives. In this way, such a "flex mode" drive with an appropriately customized host adapter can be installed, without modification to internal drive programming or to the drive's hardware interface, in many different systems.

For example, the "flex mode" drive 20 having internal ROM or RAM programming corresponding to the information block definitions of FIGS. 5, 6 and 7, and register set definitions of Table 3, can be used to emulate a PS/2 ST506 disk drive. In order to accomplish this, a host adapter 32 must be provided for converting ST506 commands issued by the disk driving software into commands having the "flex mode" format of the FIGS. 5, 6, 7 and Table 3, and for translating the "flex mode" formatted output from the drive 20 into ST506 formatted information.

Figure 8:
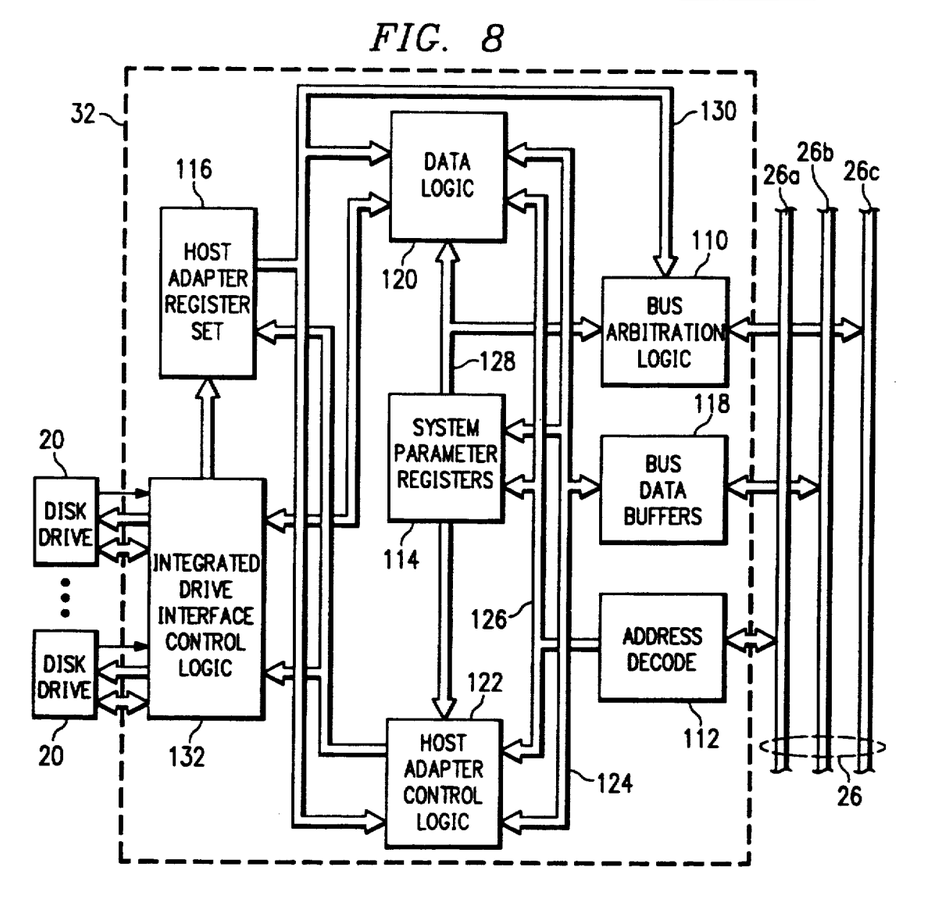
FIG. 8 is a block diagram of a host adapter designed in accordance with the present invention.

FIG. 8 is a block diagram of the host adapter 32 required in order for the drive of the present invention to emulate an ST506 disk drive. As with the host adapter of FIG. 3, the host adapter 32 of FIG. 8 includes logic 110 which allows the drive to conform to the protocol defined for the system bus 26, and address decoding logic 112 for determining when access to the disk drive's I/O mapped locations occurs. In one embodiment of the invention, the system bus 26 conforms to the Microchannel bus protocol, well known in the art. According to this protocol, certain system and bus parameters are used during bus operation to determine behavior of arbitrating devices. Accordingly, registers 114 are provided for storing system and Microchannel bus parameter information.

Typically, the "flex mode" definition for the register set 40 in the drive controller 24 is incompatible with the register set definition for the disk protocol being emulated. The registers 40 in the controller 24, therefore, are not I/O mapped, since ST506 disk driving software expects a different (ST506 compatible) set of registers to be mapped into particular locations in the I/O address space. Similarly, the information block formats defined as described above for "flex mode" drives are not identical to the formats defined for the ST506 protocol. For these reasons, the host adapter 32 must provide a set of ST506-compatible registers to be I/O mapped into the locations specified for the ST506 protocol. By providing these registers, the emulation of an ST506 drive with a "flex mode" drive is not detectable by the host processor, which functions as if a conventional ST506 drive were installed.

Referring to FIG. 8, a set of ST506 registers 116 is included in the host adapter 32. The address decoding logic 112 implements the mapping of the ST506 registers 116 into the host processor's I/O address space, so that when access is made to an I/O address reserved for the ST506 protocol, data will be transferred to or from the appropriate register in the set 116. Incoming data is received from the system data bus 26b by the host adapter 32 by means of bus data buffers 118.

Overall operation of the host adpater 32 is coordinated by host adapter control logic 122. In one embodiment, the control logic 122 takes the form of a logical state machine implemented as an Application Specific Integrated Circuit (ASIC), as gate array logic, or the like. Data transfer within the host adapter 32 is controlled by data logic 120. Data in the bus data buffers 118 is available to the data logic 120, system parameter registers 114 and host adapter control logic 122 via host adapter data line 124. Similarly, addresses from the system address bus 26a are available to these three units 114, 120, 122 on the host adapter address lines 126. Information in the system parameter registers 114 is available to the bus arbitration logic 110, data logic 120 and host adapter control logic 122 on host adapter parameter lines 128. Data in the ST506 host adapter registers 116 can be routed to the bus arbitration logic 110, data logic 120, and host adapter control logic 122 along register lines 130.

Since it is desirable that the hardware interface with the drive 20 need not be modified for a particular application, the host adapter 32 also includes logic 132 for establishing the interface with the drive 20. Under control of the host adapter control logic 122, the interface logic 132 generates the control signals to the drive 20 which conform to the conventional "register mode" hardware interface specification.

In order to request a block-transfer of information, the ST506 disk driving routines load set-up information describing the requested transfer into appropriate registers in the ST506 register set 114. As the registers in the set 114 are loaded, the host adapter state machine in the control logic 122 will convert the ST506 set-up information into "flex mode" format, and write the corresponding "flex mode" versions of this information into the appropriate positions in the controller register set 40. Once the set-up information has been loaded into the registers 114, (and the translated information has been loaded into the drive's register set 40) the disk driving software will write a command to a particular register in the set 114 requesting the execution of the data transfer. This command is detected by the host adapter control logic 122, which will write a corresponding command to the Opcode Register (register R8) in the controller register set 40.

In the case of a disk read operation, data read from disk is sent from the "flex mode" data port (register R1) in the register set 40 through the disk interface control logic 132 to the host adapter register set 116. Under control of the data logic 120 and the bus interface logic 110, the high-speed block-transfer from the ST506 data port register occurs, and the data appears on the system bus as expected by the ST506 disk driver.

In the case of a disk write operation, data sent by the disk driver is received by the host adapter bus data buffers 118. Under control of the data logic 120, host adapter control logic 122, and drive interface control logic 132, the block-transfer of data through the "flex mode" data port (register R1) in the set 40 takes place.

In summary, the host adapter 32 allows the "flex mode" drive 20 to function as if it were being driven by "flex mode" compatible disk drivers, and at the same time allows the host processor 12 and operating system to function as if an ST506 disk drive were installed in the system.

From the above detailed description of a particular embodiment of the present invention, it should be evident that a versatile disk drive design using a flexible interface protocol has been disclosed which, in combination with an appropriately customized host adapter, can be employed in a great variety of computer systems.

Although a specific embodiment of the invention has been described in detail, it is to be understood that various changes, substitutions and alterations can be made therein. In particular, with reference to the "flex mode[ register definitions of Table 3, and the "flex mode" definitions and formats of information blocks depicted in FIGS. 5, 6, and 7, it should be apparent that these registers and information blocks can be defined and formatted to include as much or as little information as is necessary for a particular host/drive configuration. In addition, the present invention can be applied to systems using any of a wide variety of disk driver protocols and bus interface protocols. The particular configuration and implementation of the host adapter 32 can also differ from the one described herein. The peripheral interface disclosed herein is particularly adapted for use with a disk drive system, but could be employed, in its broader aspects, in establishing coordinated communication between a host processor and any of a number of I/O devices which have a local processor, including but not limited to: magnetic tape drive storage devices, CD ROM storage systems, modems, and printers. Its wide range of applicability is facilitated, in part, by the flexibility with regard to the size and format of the transferred information blocks, and in part by the inclusion of a highly functional host adapter.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments as fall within the true scope of the invention.

TABLE 1

| REGISTER NUMBER | PROCESSOR READ FUNCTION | PROCESSOR WRITE FUNCTION |
| --- | --- | --- |
| R1 | DATA PORT | DATA PORT |
| R2 | ERROR REGISTER | PRECOMP CYLINDER |
| R3 | SECTOR COUNT | SECTOR COUNT |
| R4 | SECTOR NUMBER | SECTOR NUMBER |
| R5 | CYLINDER LOW | CYLINDER LOW |
| R6 | CYLINDER HIGH | CYLINDER HIGH |
| R7 | DRIVE/HEAD REGISTER | DRIVE/HEAD REGISTER |
| R8 | STATUS REGISTER | OPCODE REGISTER |
| R9 | ALT. STATUS REGISTER | CONTROL BIT REGISTER |
| R10 | DRIVE ADDRESS REG. | NOT USED |

TABLE 2

| COMMAND NUMBER | COMMAND NAME |
| --- | --- |
| 1 | RECALIBRATE |
| 2 | READ SECTOR(S) |
| 3 | WRITE SECTOR(S) |
| 4 | READ VERIFY SECTOR(S) |
| 5 | FORMAT TRACK |
| 6 | SEEK |
| 7 | EXECUTE DRIVE DIAGNOSTIC |
| 8 | INITIALIZE DRIVE PARAMETERS |
| 9 | READ SECTOR BUFFER |
| 10 | WRITE SECTOR BUFFER |
| 11 | IDENTIFY DRIVE |

TABLE 3

| REGISTER NUMBER | PROCESSOR READ FUNCTION | PROCESSOR WRITE FUNCTION |
| --- | --- | --- |
| R1 | DATA PORT | DATA PORT |
| R2 | OPERATION STATUS LSB | ACTION REGISTER LSB |
| R3 | OPERATION STATUS MSB | ACTION REGISTER MSB |
| R4 | TRANSFER COUNT LSB | NOT USED |
| R5 | TRANSFER COUNT MSB | NOT USED |
| R6 | NOT USED | NOT USED |
| R7 | DRIVE SELECT REGISTER | DRIVE SELECT REGISTER |
| R8 | DRIVE STATUS REGISTER | OPCODE REGISTER |
| R9 | NOT USED | CONTROL BIT REGISTER |
| R10 | NOT USED | NOT USED |

TABLE 4

| OPERATION NUMBER | OPERATION CODE | OPERATION NAME |
|---|---|---|
| 1 | 0000 | (NOT USED) |
| 2 | 0001 | READ |
| 3 | 0010 | READ VERIFY |
| 4 | 0011 | READ LONG |
| 5 | 0100 | READ CONTROLLED DATA |
| 6 | 0101 | READ ID |
| 7 | 0110 | READ DATA RECOVERY |
| 8 | 0111 | READ/WRITE BUFFER |
| 9 | 1000 | RECALIBRATE |
| 10 | 1001 | WRITE |
| 11 | 1010 | WRITE VERIFY |
| 12 | 1011 | WRITE LONG |
| 13 | 1100 | WRITE CONTROLLED DATA |
| 14 | 1101 | FORMAT DRIVE |
| 15 | 1110 | SEEK |
| 16 | 1111 | FORMAT TRACK |

What is claimed is:

1. A method of selectively operating a peripheral input/output device in a computer system in one of first and second exclusive modes of operation, comprising the steps of:
    a) defining a peripheral I/O address space within a peripheral controller to include a plurality of registers for controlling the transfer of multiple word data blocks and data words to and from a CPU and to and from a peripheral input/output device, said registers including a data port and a plurality of control and/or status ports;
    b) in a first exclusive mode of operation, writing command information to one or more of said registers in said peripheral I/O address space to activate said peripheral controller to accept a multiple-word data block, said one or more registers to which command information is written including said data port and selected ones of said status and/or control ports;
    c) while in said first exclusive mode of operation, transferring said multiple-word data block from said CPU to said peripheral controller along a first data path by writing said multiple-word data block to a data buffer within said peripheral controller and outside said peripheral I/O address space;
    d) and, while in said first exclusive mode of operation, thereafter transferring data between said peripheral input/output device and said CPU along said first data path by writing multiple-word data blocks to and reading multiple-word data blocks from said data buffer; or
    e) in a second exclusive mode of operation, writing command information to said plurality of registers to activate said peripheral controller for a data transfer, said plurality of registers to which command information is written including selected ones of said status and/or control ports;
    f) and, while in said second exclusive mode of operation, thereafter transferring data between said peripheral input/output device and said CPU along a second data path by writing data words to and reading data words from said data port.

2. A method according to claim 1 wherein said peripheral input/output device is a disk drive.

3. A method according to claim 1 wherein said registers and said data port are in an I/O address space of said CPU.

4. A method according to claim 1 wherein said multiple-word information block contains a variable number of words of information.

5. A method according to claim 1 including the step of both writing to and reading from said one or more registers by both said CPU and said peripheral controller.

6. A method according to claim 1 wherein both said CPU and said peripheral controller write to and read from said data port.

7. A method according to claim 1 wherein said peripheral input/output device is a disk drive and said step of transferring a multiple-word information block includes transferring identification of specific sectors of said disk drive to be accessed.

8. A method according to claim 1 wherein said information block includes command bits and status bits.

9. A method according to claim 8 wherein said information block includes a plurality of words of information, and includes parameter information in said words.

10. A method according to claim 1 and further comprising the step of receiving, while in said first exclusive mode of operation, status information from said peripheral input/output device transferred to said CPU through said data port.

11. A method according to claim 1 wherein the step of defining a peripheral I/O address space within a peripheral controller to include a data port and a plurality of control and/or status ports further comprises the steps of defining said peripheral I/O address space to include a data port, at least one control port, and at least one status port.

12. A method according to claim 11 wherein the step of writing, while in said second exclusive mode of operation, command information to said registers further comprises the step of writing command information to said at least one control port.

13. A method according to claim 12 and further comprising the step of receiving, while in said second exclusive mode of operation, status information from said peripheral input/output device transferred to said CPU through said at least one status port.

14. A method according to claim 13 and further comprising the step of receiving, while in said first exclusive mode of operation, status information from said peripheral input/output device transferred to said CPU through said data port.

* * * * *

UNITED STATES PATENT AND TRADEMARK OFFICE
CERTIFICATE OF CORRECTION

PATENT NO. : 5,150,465
DATED : September 22, 1992
INVENTOR(S) : Bush, Kenneth L., et al.

It is certified that error appears in the above-identified patent and that said Letters Patent is hereby corrected as shown below:

Column 2, line 23, "vie" should be --via--.

Column 8, line 1, "effect" should be --effects--.

Column 9, line 16, "tranfer" should be --register--

Column 12, line 3, "IF" should be --If--.

Column 12, line 21, "Registere" should be --Register--.

Column 23, line 52, ""flex mode[" " should be --"flex mode"--.

Signed and Sealed this

Eighth Day of February, 1994

Attest:

BRUCE LEHMAN

Attesting Officer

Commissioner of Patents and Trademarks